United States Patent
Liu et al.

(10) Patent No.: US 11,812,153 B2
(45) Date of Patent: Nov. 7, 2023

(54) SYSTEMS AND METHODS FOR FISHEYE CAMERA CALIBRATION AND BIRD'S-EYE-VIEW IMAGE GENERATION IN A SIMULATION ENVIRONMENT

(71) Applicant: Volvo Car Corporation, Gothenburg (SE)

(72) Inventors: Zhipeng Liu, Redwood City, CA (US); Chihiro Suga, San Jose, CA (US); Sihao Ding, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/687,794

(22) Filed: Mar. 7, 2022

(65) Prior Publication Data
US 2023/0283906 A1   Sep. 7, 2023

(51) Int. Cl.
*H04N 23/698* (2023.01)
*B60R 1/28* (2022.01)

(52) U.S. Cl.
CPC .............. *H04N 23/698* (2023.01); *B60R 1/28* (2022.01); *B60R 2300/101* (2013.01); *B60R 2300/30* (2013.01)

(58) Field of Classification Search
None
See application file for complete search history.

(56) References Cited

U.S. PATENT DOCUMENTS

| | | | |
|---|---|---|---|
| 2010/0136507 A1* | 6/2010 | Miyata | G09B 9/04 434/29 |
| 2011/0128377 A1* | 6/2011 | Katz | H04N 5/272 348/143 |
| 2020/0098164 A1* | 3/2020 | Bruns | G06T 15/10 |
| 2020/0242804 A1* | 7/2020 | Eisenmann | G06T 7/12 |
| 2020/0342652 A1* | 10/2020 | Rowell | G06V 10/82 |

* cited by examiner

*Primary Examiner* — Rebecca A Volentine
(74) *Attorney, Agent, or Firm* — Clements Bernard Walker; Christopher L. Bernard

(57) ABSTRACT

Systems and methods for fisheye camera calibration and BEV image generation in a simulation environment. This fisheye camera calibration enables the extrinsic and intrinsic parameters of the fisheye camera to be computed in the simulation environment, where data is readily available, collectible, and manipulatable. Given a surround vision system, with multiple fisheye cameras disposed around a vehicle, and these extrinsic and intrinsic parameters, undistorted and BEV images of the surroundings of the vehicle can be generated in the simulated environment, for simulated fisheye camera testing and validation, which may then be extrapolated to real-world fisheye camera testing and validation, as appropriate. Because the simulation tool can be used to create and readily manipulate the simulated fisheye camera, the vehicle, its surroundings, obstacles, targets, markers, and the like, the entire calibration and image generation process is streamlined and may be automated.

20 Claims, 8 Drawing Sheets

SYSTEMS AND METHODS FOR FISHEYE CAMERA CALIBRATION AND BIRD'S-EYE-VIEW IMAGE GENERATION IN A SIMULATION ENVIRONMENT

TECHNICAL FIELD

The present disclosure relates generally to the automotive, automotive simulation, and camera testing and validation fields. More particularly, the present disclosure relates to systems and methods for fisheye camera calibration and bird's-eye-view (BEV) image generation in a simulation environment.

BACKGROUND

In the real world, fisheye cameras, such as those coupled to the four sides of a vehicle or the like, can be calibrated to generate undistorted images, which may then be mapped to and stitched together to form an overhead, BEV image of the surroundings of the vehicle, for example. This calibration process provides the distortion parameters of a given fisheye camera, such as the focal length, pixel sizes, etc. The calibration process may be a time-consuming process, whereby a target object or marker is manually moved and imaged successively, such that target object or marker coordinates may be associated with image pixel locations for camera testing and validation purposes, for example.

It is possible and often beneficial to create a virtual fisheye camera in a simulation environment, such as a simulation environment created using Unity (Unity Technologies) or the like. At present, however, there are no means to calibrate such a fisheye camera so that undistorted and BEV images and the like can be generated in this simulation environment as they are in the real world, such that camera testing and validation can also be performed in the simulation environment, for example. Simulated camera testing and validation has the benefit of eliminating manual steps and enables ready data availability and collection, among other benefits.

This background is provided as an illustrative contextual environment only. It will be readily apparent to those of ordinary skill in the art that the methods and systems of the present disclosure may be implemented in other contextual environments equally.

SUMMARY

The present disclosure provides systems and methods for fisheye camera calibration and BEV image generation in a simulation environment. This fisheye camera calibration enables the extrinsic and intrinsic parameters of the fisheye camera to be computed in the simulation environment, where data is readily available, collectible, and manipulatable. Given a surround vision system, with multiple fisheye cameras disposed around a vehicle, and these extrinsic and intrinsic parameters, undistorted and BEV images of the surroundings of the vehicle can be generated in the simulated environment, for simulated fisheye camera testing and validation, which may then be extrapolated to real-world fisheye camera testing and validation, as appropriate. Because the simulation tool can be used to create and readily manipulate the simulated fisheye camera, the vehicle, its surroundings, obstacles, targets, markers, and the like, the entire calibration and image generation process is streamlined and may be automated. Advantageously, the systems and methods of the present disclosure may also be applied to other cameras and perception sensors in a simulation environment as well. As used herein, "fisheye camera" is therefore intended to refer to these other cameras and perception sensors equally.

In one illustrative embodiment, the present disclosure provides a simulated camera system, including: memory storing instructions executed by a processor to generate a simulated camera in a simulated environment and obtain a distorted image using the simulated camera; memory storing instructions executed by the processor to calibrate the simulated camera and obtain intrinsic parameters of the simulated camera; and memory storing instructions executed by the processor to generate an undistorted image from the distorted image using the intrinsic parameters of the simulated camera. The simulated camera system further includes: memory storing instructions executed by the processor to determine coordinates of the simulated camera in the simulated environment and obtain extrinsic parameters of the simulated camera; and memory storing instructions executed by the processor to generate a perspective-shifted image from the undistorted image using the extrinsic parameters of the simulated camera. The simulated camera system further includes memory storing instructions executed by the processor to obtain a plurality of distorted images using the simulated camera, generate a plurality of undistorted images from the plurality of distorted images, generate a plurality of perspective-shifted images from the plurality of undistorted images, and stitch the plurality of perspective-shifted images together. Optionally, the simulated camera includes a simulated fisheye camera and the distorted image includes a fisheye image. Optionally, the perspective-shifted image includes a bird' s-eye-view image. The simulated camera system further includes memory storing instructions executed by the processor to use the intrinsic parameters of the simulated camera to generate an undistortion and rectification transformation map that is used to generate the undistorted image from the distorted image. The simulated camera system further includes memory storing instructions executed by the processor to iteratively calibrate the simulated camera using an artificial intelligence algorithm.

In another illustrative embodiment, the present disclosure provides a simulated camera method, including: generating a simulated camera in a simulated environment and obtaining a distorted image using the simulated camera; calibrating the simulated camera and obtaining intrinsic parameters of the simulated camera; and generating an undistorted image from the distorted image using the intrinsic parameters of the simulated camera. The simulated camera method further includes: determining coordinates of the simulated camera in the simulated environment and obtaining extrinsic parameters of the simulated camera; and generating a perspective-shifted image from the undistorted image using the extrinsic parameters of the simulated camera. The simulated camera method further includes obtaining a plurality of distorted images using the simulated camera, generating a plurality of undistorted images from the plurality of distorted images, generating a plurality of perspective-shifted images from the plurality of undistorted images, and stitching the plurality of perspective-shifted images together. Optionally, the simulated camera includes a simulated fisheye camera and the distorted image includes a fisheye image. Optionally, the perspective-shifted image includes a bird' s-eye-view image. The simulated camera method further includes using the intrinsic parameters of the simulated camera to generate an undistortion and rectification transformation map that is used to generate the undistorted image from the distorted image. The simulated camera method further includes iteratively calibrating the simulated camera using an artificial intelligence algorithm.

In a further illustrative embodiment, the present disclosure provides a non-transitory computer-readable medium including instructions stored in a memory and executed by a processor to carry out simulated camera steps including: generating a simulated camera in a simulated environment and obtaining a distorted image using the simulated camera; calibrating the simulated camera and obtaining intrinsic parameters of the simulated camera; and generating an undistorted image from the distorted image using the intrinsic parameters of the simulated camera. The steps further include: determining coordinates of the simulated camera in the simulated environment and obtaining extrinsic parameters of the simulated camera; and generating a perspective-shifted image from the undistorted image using the extrinsic parameters of the simulated camera. The steps further include obtaining a plurality of distorted images using the simulated camera, generating a plurality of undistorted images from the plurality of distorted images, generating a plurality of perspective-shifted images from the plurality of undistorted images, and stitching the plurality of perspective-shifted images together. Optionally, the simulated camera includes a simulated fisheye camera and the distorted image includes a fisheye image. Optionally, the perspective-shifted image includes a bird's-eye-view image. The steps further include using the intrinsic parameters of the simulated camera to generate an undistortion and rectification transformation map that is used to generate the undistorted image from the distorted image.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Again, the present disclosure provides systems and methods for fisheye camera calibration and BEV image generation in a simulation environment. This fisheye camera calibration enables the extrinsic and intrinsic parameters of the fisheye camera to be computed in the simulation environment, where data is readily available, collectible, and manipulatable. Given a surround vision system, with multiple fisheye cameras disposed around a vehicle, and these extrinsic and intrinsic parameters, undistorted and BEV images of the surroundings of the vehicle can be generated in the simulated environment, for simulated fisheye camera testing and validation, which may then be extrapolated to real-world fisheye camera testing and validation, as appropriate. Because the simulation tool can be used to create and readily manipulate the simulated fisheye camera, the vehicle, its surroundings, obstacles, targets, markers, and the like, the entire calibration and image generation process is streamlined and may be automated. Advantageously, the systems and methods of the present disclosure may also be applied to other cameras and perception sensors in a simulation environment as well. As used herein, "fisheye camera" is therefore intended to refer to these other cameras and perception sensors equally.

Figure 1:
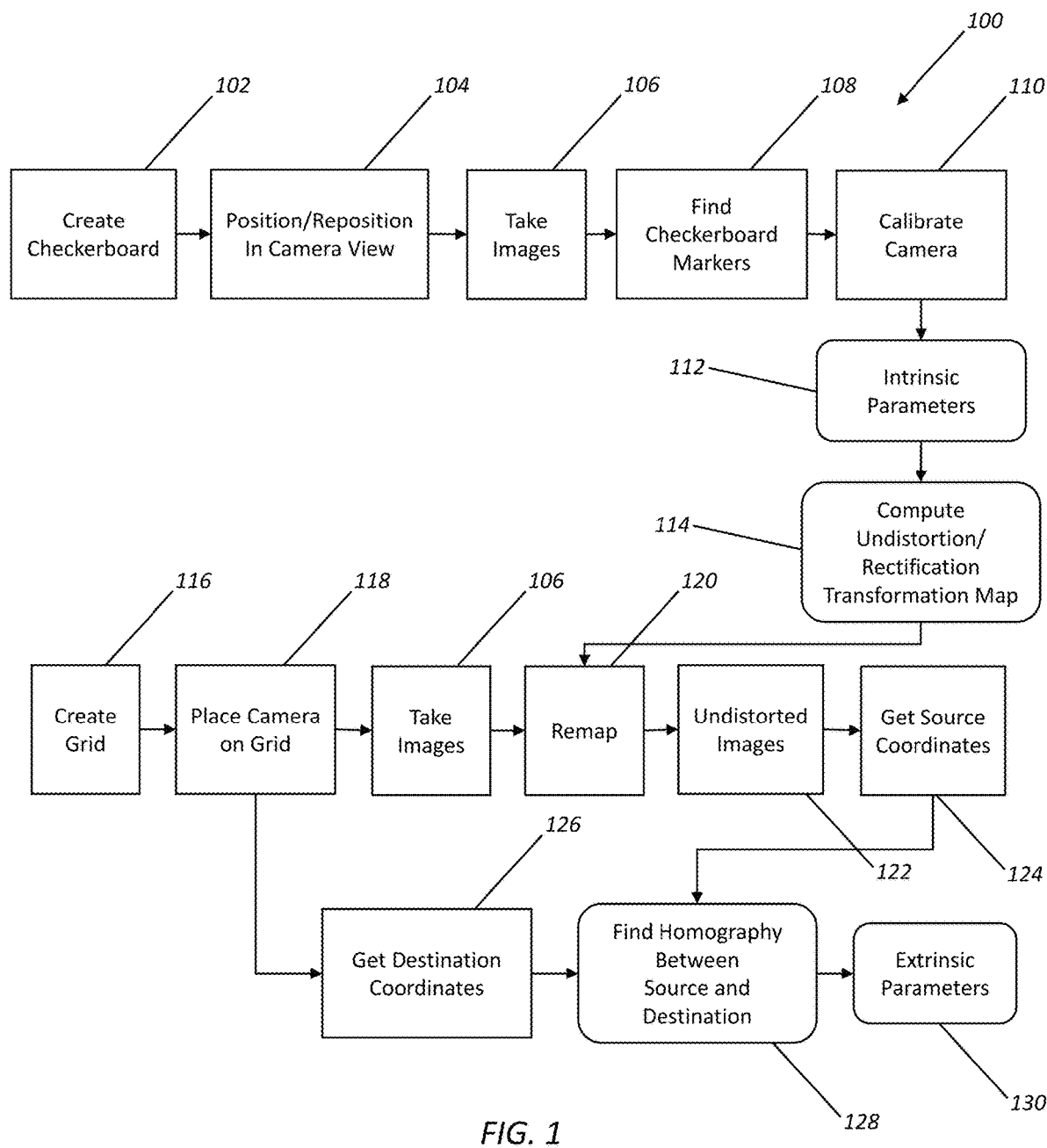
FIG. 1 is a schematic diagram illustrating one embodiment of the system and method for calibrating a fisheye camera in a simulation environment in accordance with the present disclosure.

Referring now specifically to FIG. 1, in one illustrative embodiment, the processor-implemented system and method 100 for calibrating a fisheye camera in a simulation environment include creating a target/marker 102, such as a checkerboard or the like, that is positioned and repositioned in the camera view 104 such that fisheye images may be taken 106. Again, it is worth noting that the camera here is a simulated camera taking images of a simulated checkerboard in the simulated environment. The simulated checkerboard may be moved to and imaged in predetermined positions or randomly. Markers associated with the imaged checkerboards are then located 108 to determine the distortion associated with the fisheye images. For example, markers may be connected in the fisheye images to identify lines that should be straight, thereby highlighting the distortion associated with the fisheye images. From this distortion information, the simulated camera may be calibrated 110 and the intrinsic camera parameters are determined 112, such as simulated focal length, pixel sizes, etc. This process is expedited by the fact that, because the camera is simulated, the ideal parameters are necessarily known. In addition, the process of calibrating the simulated camera to obtain intrinsic parameters is expedited and unbiased because the checkerboard is simulated and can be positioned randomly when imaged, which ensures adequate and uniformly distributed samples. Using the intrinsic parameters, an undistortion and rectification transformation map 114 is computed that can be used generate subsequent undistorted images from distorted images. In other words, the distortion and associated correction factors are now known for the simulated fisheye camera, When obtaining an image, a grid is first created in the simulated environment 116 and the simulated camera is placed on the grid 118. The fisheye image is then taken 106, this image being a distorted image. By applying the undistortion and rectification transformation map 114 to the image, a remapping is performed 120 that produces an undistorted image 122, such that the undistorted image 122 is produced from the fisheye image 106 knowing all the appropriate correction factors for the given simulated camera. With knowledge of the source coordinates 124 in the undistorted image 122 and the destination coordinates 126 from the camera placement on the initially created grid, a homography can be found between source coordinates and destination coordinates 128 and subsequently applied to generate a corresponding BEV image. Thus, there is a mapping of source coordinates in multiple undistorted images to be stitched together to destination coordinates to form a BEV image, which represents an overhead view of the four directions surrounding a vehicle, for example. This homography is a projection matrix between planar surfaces. Thus, the extrinsic parameters 130 are now known, such as relative translation and rotation with respect to the vehicle and/or the BEV origin.

Figure 2:
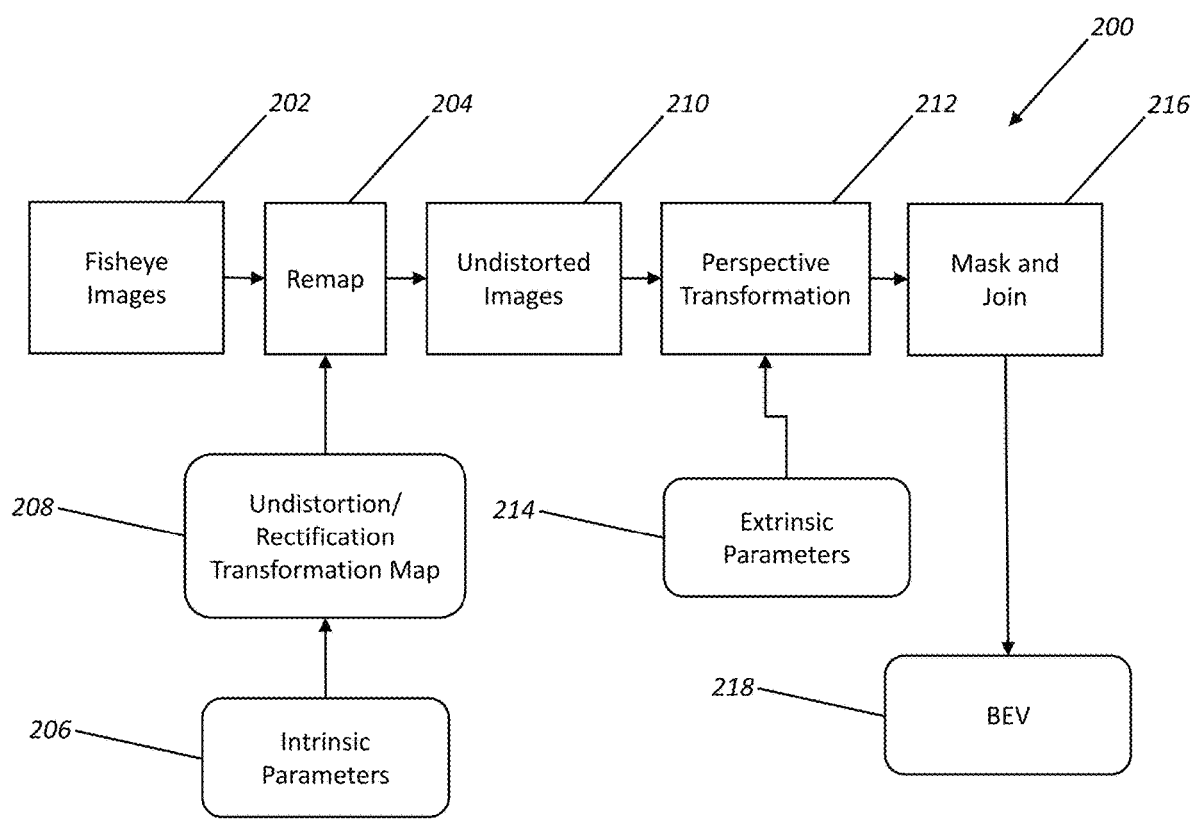
FIG. 2 is a schematic diagram illustrating one embodiment of the system and method for generating a BEV image in a simulation environment in accordance with the present disclosure.

Referring now specifically to FIG. 2, in one illustrative embodiment, the processor-implemented system and method 200 for generating a BEV image in a simulation environment include, given a plurality of fisheye images 202, such as the four simulated fisheye images taken by the four simulated fisheye cameras surrounding a simulated vehicle in the simulation environment, first remapping 204 the fisheye images 202 using the intrinsic parameters 206 and the undistortion and rectification transformation map 208 determined using the calibration routine of FIG. 1 to provide a plurality of corresponding undistorted images 210. A perspective transformation 212 is then performed using the extrinsic parameters 214 determined using the calibration routine of FIG. 1. After masking and joining 216, the stitched BEV image 218 results. Thus, the process takes the distorted side fisheye images, transforms them to undistorted side images, and then maps them to a single stitched overhead view, for example, using the intrinsic and extrinsic parameters and the undistortion and rectification transformation map derived from fisheye camera calibration, all in the simulated environment.

Figure 3:
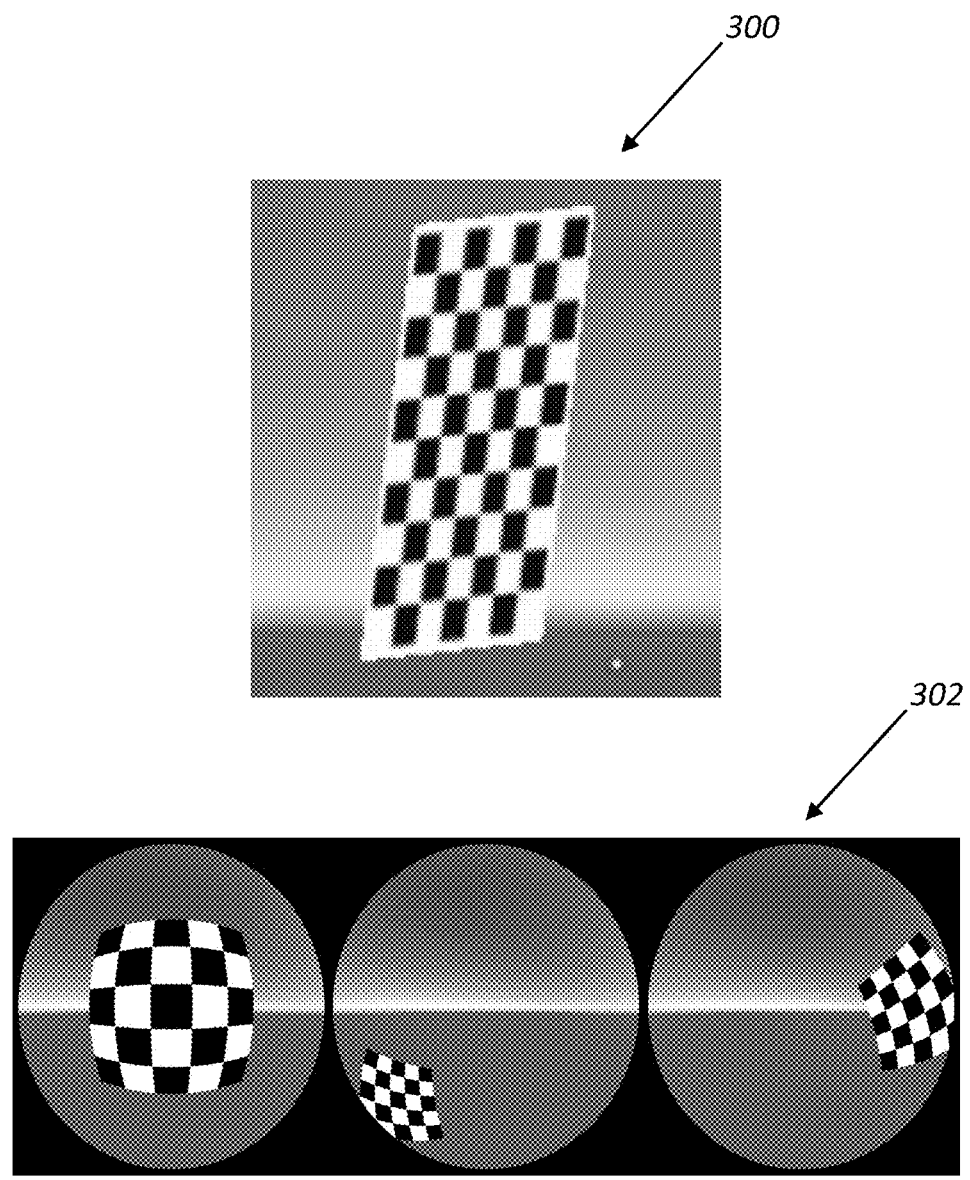
FIG. 3 is a schematic diagram illustrating the determination of fisheye camera intrinsic parameters using the systems and methods of the present disclosure.

The intrinsic parameters determined herein are internal and fixed with respect to a particular camera setup—in this case a simulated camera setup, which may or may not correspond to a real-world camera setup. Using these intrinsic parameters, one can map the pixel coordinates in the image frame to the camera coordinates, and hence undistort a fisheye image. To determine these intrinsic parameters, the checkerboard 300 with known dimensions is imaged in the simulation. Specifically, referring to FIG. 3, the checkerboard 300 is randomly placed in front of the simulated fisheye camera and imaged 302. Using Open CV functions or the like, the coordinates of the checkerboard corners can be found in each distorted image. Then, the mapping from pixel coordinates in the image to camera coordinates can be calculated, providing the intrinsic parameters of the fisheye camera in the simulated environment.

Figure 4:
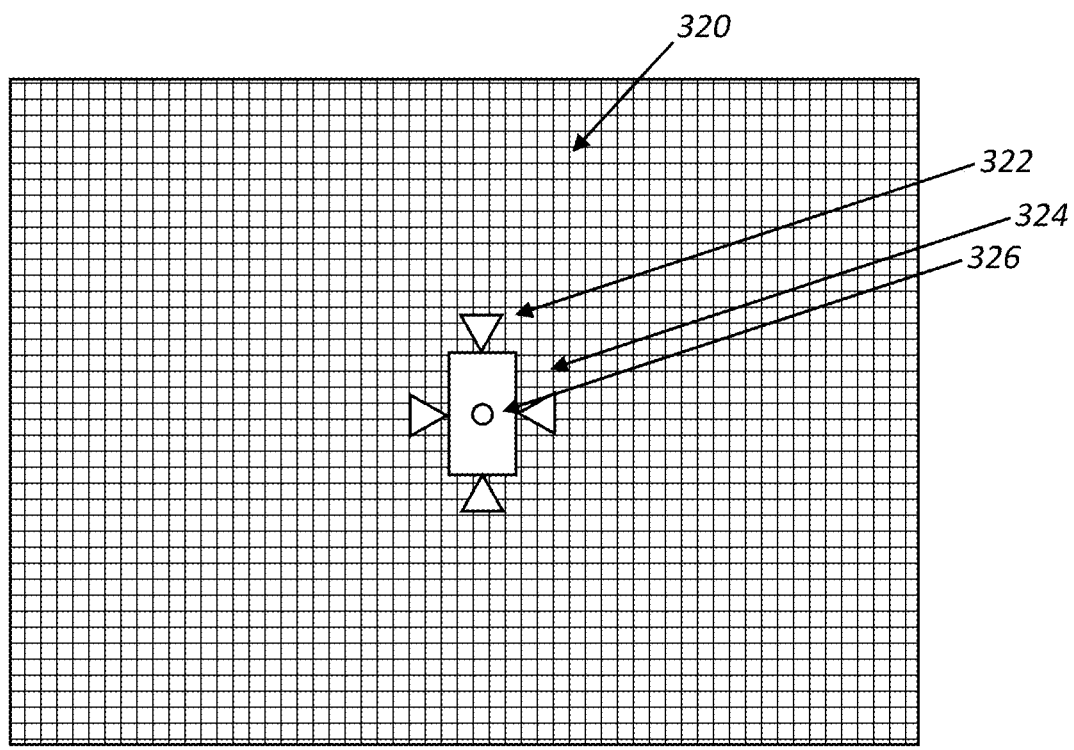
FIG. 4 is a schematic diagram illustrating the determination of fisheye camera extrinsic parameters using the systems and methods of the present disclosure.

The extrinsic parameters herein define the coordinate system transformations from world coordinates to camera coordinates. The extrinsic parameters are external to the camera and may change with the world frame. Referring to FIG. 4, a grid 320 is created as ground in the simulated environment. Four simulated fisheye cameras 322 are then disposed around the simulated vehicle 324, facing four different directions. It will be readily apparent to those of ordinary skill in the art that other simulated camera arrangements could be used as well. For the grid 320 here, the lines are assumed to be spaced by 1 m and are marked for easy identification. A point is selected as the world coordinate origin 326 and the coordinates of all other points are calculated with respect to this origin 326.

Figure 5:
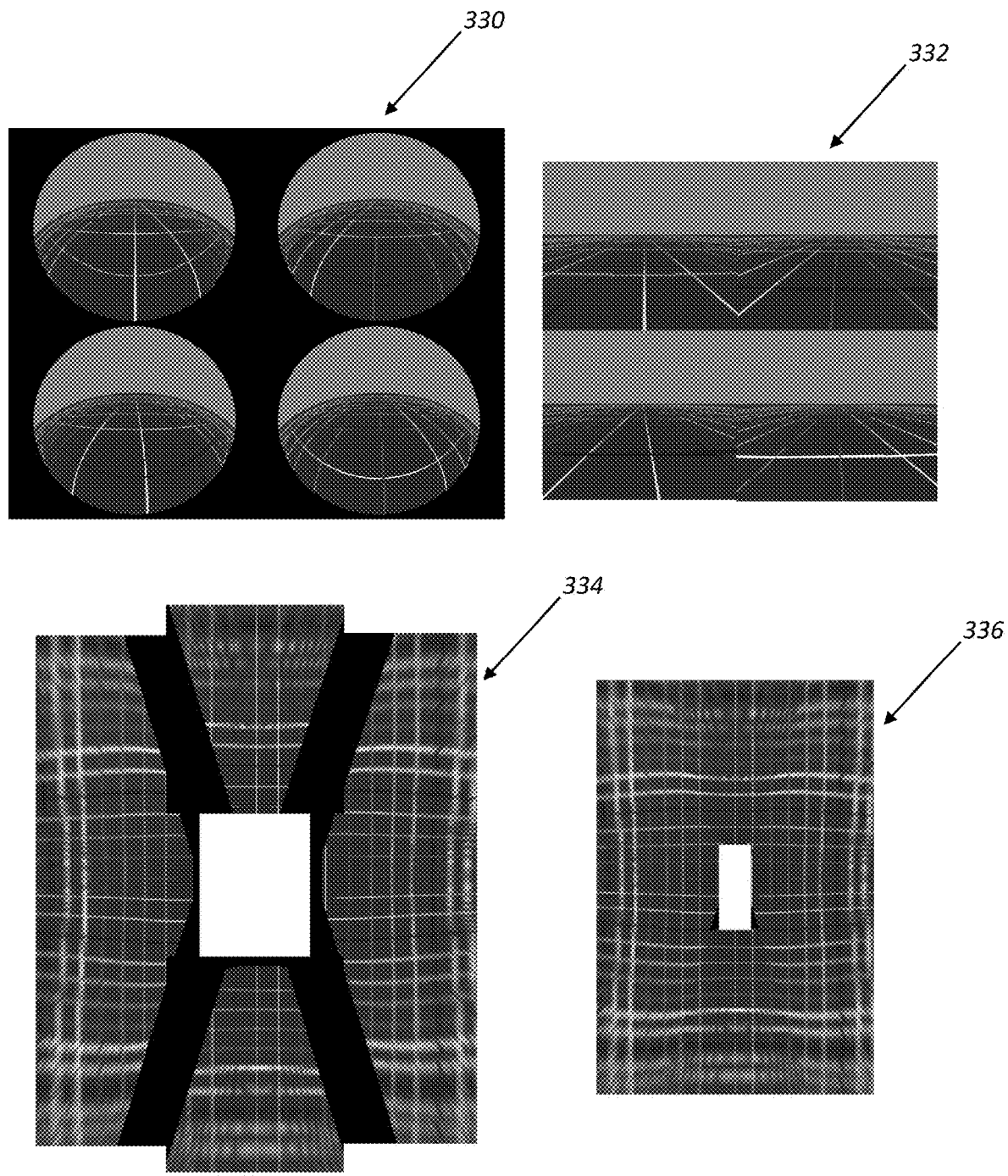
FIG. 5 is a schematic diagram illustrating examples of the distorted fisheye images obtained and the resulting undistorted images, unstitched BEV images, and stitched BEV images generated in accordance with the present disclosure.

FIG. 5 is a schematic diagram illustrating examples of the distorted fisheye images 330 obtained and the resulting undistorted images 332, unstitched BEV images 334, and stitched BEV images 336 generated using the determined intrinsic and extrinsic parameters in accordance with the present disclosure. By applying the intrinsic parameters, the distorted fisheye images 330 are converted to the undistorted images 332. Then, by applying the extrinsic parameters, the undistorted images 332 are converted to the unstitched BEV images 334. The unstitched BEV images 334 are stitched by masking and joining, providing the calibrated BEV 336. Advantageously, because a simulated environment is used for the whole process, the process may be fully automated and implemented using artificial intelligence (AI) reinforcement learning processes.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 6:
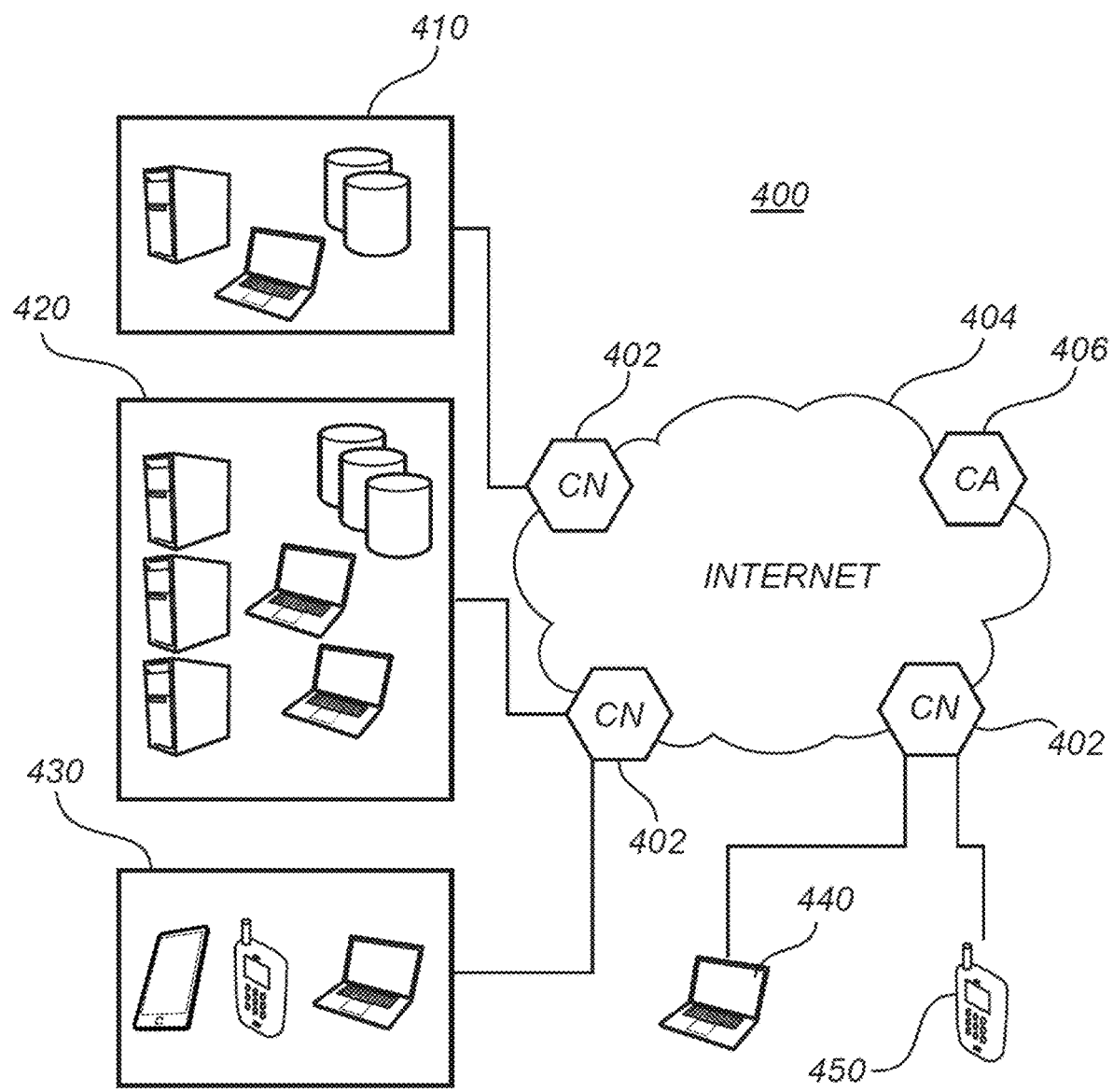
FIG. 6 is a network diagram of a cloud-based computational system for implementing various cloud-based services of the present disclosure, as appropriate.
Figure 7:
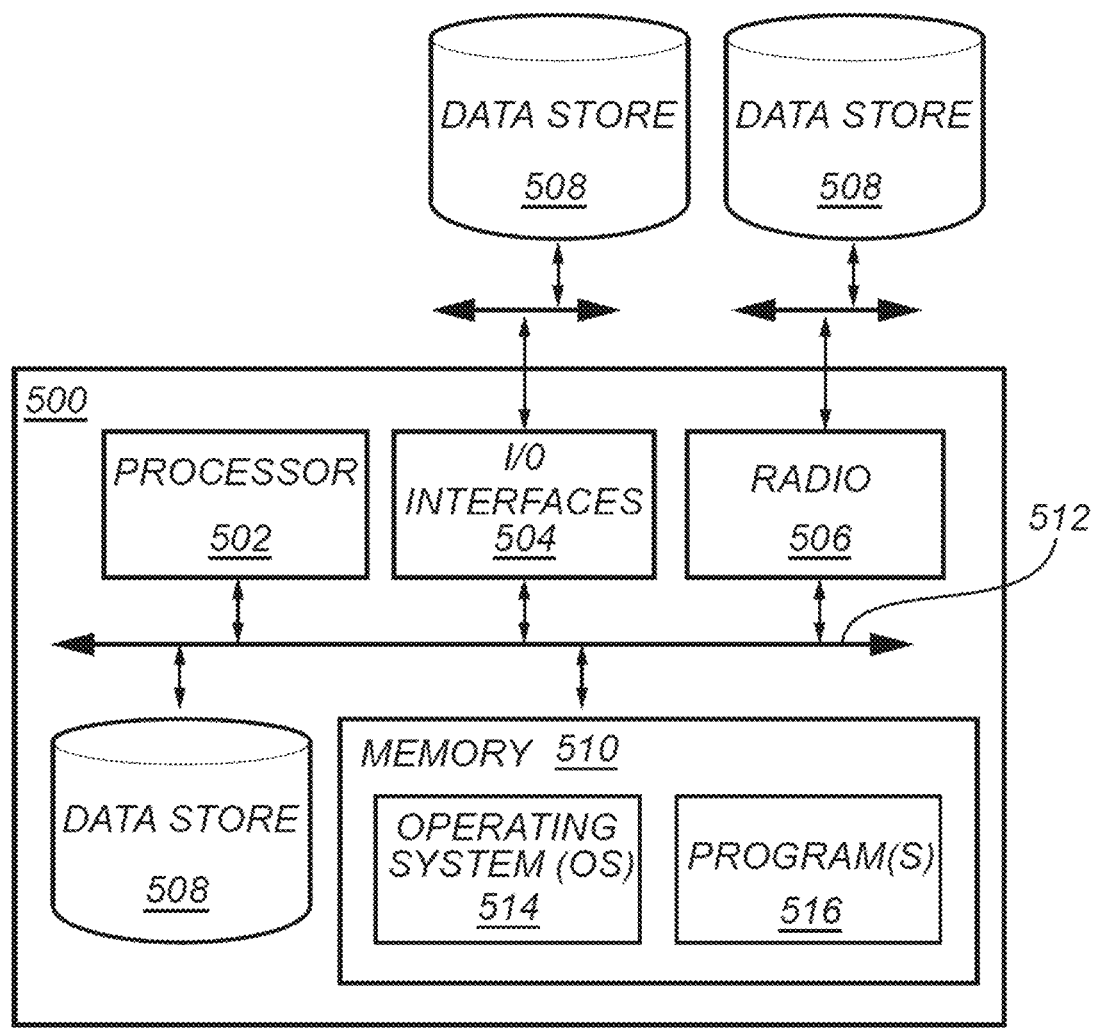
FIG. 7 is a block diagram of a server that may be used in the cloud-based computational system of FIG. 6 or stand-alone, as appropriate.

FIG. 6 is a network diagram of a cloud-based computational system 400 for implementing various cloud-based services of the present disclosure, as appropriate. The cloud-based system 400 includes one or more cloud nodes (CNs) 402 communicatively coupled to the Internet 404 or the like. The cloud nodes 402 may be implemented as a server 500 (as illustrated in FIG. 7) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 7 is a block diagram of a server 500, which may be used in the cloud-based computational system 400 (FIG. 6), in other systems, or stand-alone, as appropriate. For example, the CNs 402 (FIG. 6) and the central authority nodes 406 (FIG. 6) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 7 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 6). The network interface 506 may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
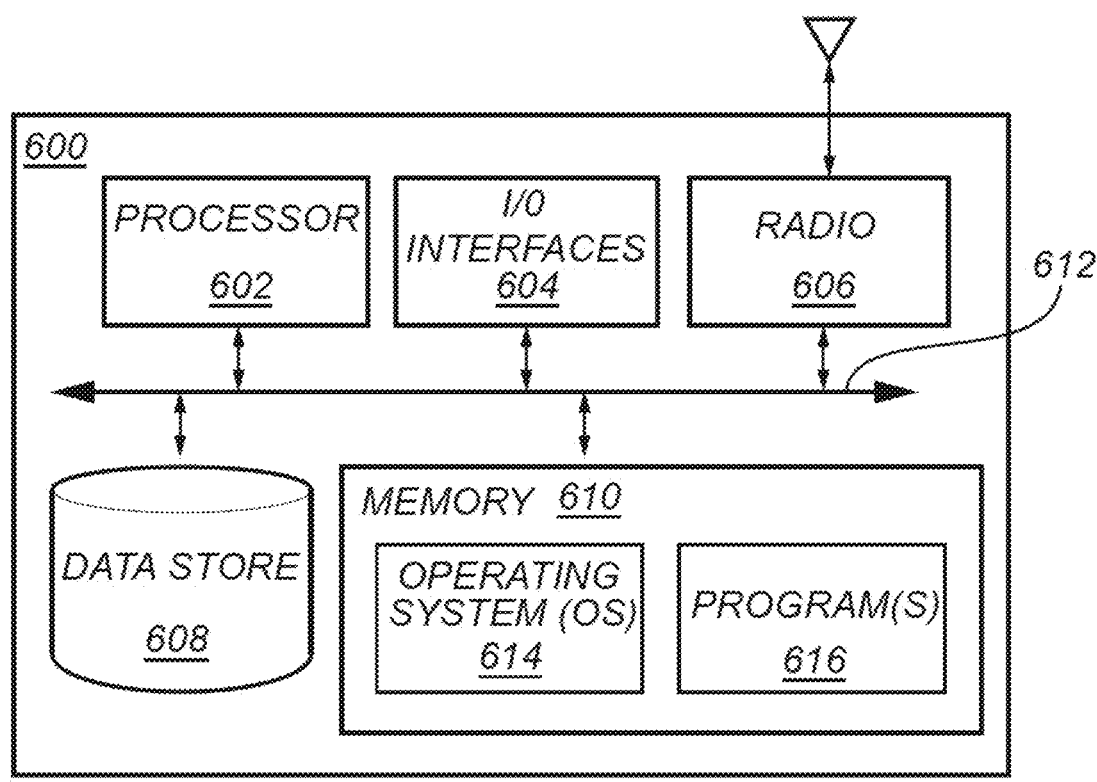
FIG. 8 is a block diagram of a device that may be used in the cloud-based computational system of FIG. 6 or stand-alone, as appropriate.

FIG. 8 is a block diagram of a device 600, which may be used in the cloud-based computational system 400 (FIG. 6), as part of a network, or stand-alone, as appropriate. Again, the device 600 can be a smartphone, a tablet, a smartwatch, an Internet of Things (IoT) device, a laptop, a virtual reality (VR) headset, etc. The device 600 can be a digital device that, in terms of hardware architecture, generally includes a processor 602, I/O interfaces 604, a radio 606, a data store 608, and memory 610. It should be appreciated by those of ordinary skill in the art that FIG. 8 depicts the device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the device 600, a semiconductor-based microprocessor (in the form of a microchip or chipset), or generally any device for executing software instructions. When the device 600 is in operation, the processor 602 is configured to execute software stored within the memory 610, to communicate data to and from the memory 610, and to generally control operations of the device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 8, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network, such as the cloud-based system 400 (FIG. 6).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A simulated camera system, comprising:
memory storing instructions executed by a processor to generate a simulated camera in a simulated environment and obtain a distorted image using the simulated camera;
memory storing instructions executed by the processor to calibrate the simulated camera and obtain intrinsic parameters of the simulated camera by successive imaging of a repositioned target/marker generated in the simulated environment using the simulated camera; and
memory storing instructions executed by the processor to generate an undistorted image from the distorted image using the intrinsic parameters of the simulated camera.

2. The simulated camera system of claim 1, further comprising:
    memory storing instructions executed by the processor to determine coordinates of the simulated camera in the simulated environment and obtain extrinsic parameters of the simulated camera; and
    memory storing instructions executed by the processor to generate a perspective-shifted image from the undistorted image using the extrinsic parameters of the simulated camera.

3. The simulated camera system of claim 2, further comprising memory storing instructions executed by the processor to obtain a plurality of distorted images using the simulated camera, generate a plurality of undistorted images from the plurality of distorted images, generate a plurality of perspective-shifted images from the plurality of undistorted images, and stitch the plurality of perspective-shifted images together.

4. The simulated camera system of claim 2, wherein the perspective-shifted image comprises a bird's-eye-view image.

5. The simulated camera system of claim 1, wherein the simulated camera comprises a simulated fisheye camera and the distorted image comprises a fisheye image.

6. The simulated camera system of claim 1, further comprising memory storing instructions executed by the processor to use the intrinsic parameters of the simulated camera to generate an undistortion and rectification transformation map that is used to generate the undistorted image from the distorted image.

7. The simulated camera system of claim 1, further comprising memory storing instructions executed by the processor to iteratively calibrate the simulated camera using an artificial intelligence algorithm.

8. A simulated camera method, comprising:
    generating a simulated camera in a simulated environment and obtaining a distorted image using the simulated camera;
    calibrating the simulated camera and obtaining intrinsic parameters of the simulated camera by successive imaging of a repositioned target/marker generated in the simulated environment using the simulated camera; and
    generating an undistorted image from the distorted image using the intrinsic parameters of the simulated camera.

9. The simulated camera method of claim 8, further comprising:
    determining coordinates of the simulated camera in the simulated environment and obtaining extrinsic parameters of the simulated camera; and
    generating a perspective-shifted image from the undistorted image using the extrinsic parameters of the simulated camera.

10. The simulated camera method of claim 9, further comprising obtaining a plurality of distorted images using the simulated camera, generating a plurality of undistorted images from the plurality of distorted images, generating a plurality of perspective-shifted images from the plurality of undistorted images, and stitching the plurality of perspective-shifted images together.

11. The simulated camera method of claim 9, wherein the perspective-shifted image comprises a bird's-eye-view image.

12. The simulated camera method of claim 8, wherein the simulated camera comprises a simulated fisheye camera and the distorted image comprises a fisheye image.

13. The simulated camera method of claim 8, further comprising using the intrinsic parameters of the simulated camera to generate an undistortion and rectification transformation map that is used to generate the undistorted image from the distorted image.

14. The simulated camera method of claim 8, further comprising iteratively calibrating the simulated camera using an artificial intelligence algorithm.

15. A non-transitory computer-readable medium comprising instructions stored in a memory and executed by a processor to carry out simulated camera steps comprising:
    generating a simulated camera in a simulated environment and obtaining a distorted image using the simulated camera;
    calibrating the simulated camera and obtaining intrinsic parameters of the simulated camera by successive imaging of a repositioned target/marker generated in the simulated environment using the simulated camera; and
    generating an undistorted image from the distorted image using the intrinsic parameters of the simulated camera.

16. The non-transitory computer-readable medium of claim 15, the steps further comprising:
    determining coordinates of the simulated camera in the simulated environment and obtaining extrinsic parameters of the simulated camera; and
    generating a perspective-shifted image from the undistorted image using the extrinsic parameters of the simulated camera.

17. The non-transitory computer-readable medium of claim 16, the steps further comprising obtaining a plurality of distorted images using the simulated camera, generating a plurality of undistorted images from the plurality of distorted images, generating a plurality of perspective-shifted images from the plurality of undistorted images, and stitching the plurality of perspective-shifted images together.

18. The non-transitory computer-readable medium of claim 16, wherein the perspective-shifted image comprises a bird's-eye-view image.

19. The non-transitory computer-readable medium of claim 15, wherein the simulated camera comprises a simulated fisheye camera and the distorted image comprises a fisheye image.

20. The non-transitory computer-readable medium of claim 15, the steps further comprising using the intrinsic parameters of the simulated camera to generate an undistortion and rectification transformation map that is used to generate the undistorted image from the distorted image.

* * * * *